US006309681B1

United States Patent
Prasad et al.

(10) Patent No.: US 6,309,681 B1
(45) Date of Patent: *Oct. 30, 2001

(54) MULTI-COMPONENT MARINADES

(75) Inventors: Nikhil Prasad; Dharam Vadehra, both of New Milford, CT (US); Hyung Kim, Irvington, NY (US); Catherine Dionis, Winterthur (CH); Gerard Loizeau, New Milford, CT (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,663

(22) Filed: Jun. 3, 1999

(51) Int. Cl.⁷ ................. A23L 1/31; A23L 1/315
(52) U.S. Cl. ............... 426/61; 426/63; 426/55; 426/58; 426/250; 426/540; 426/652
(58) Field of Search ............... 426/250, 540, 426/34, 61, 652, 63, 55, 58, 589

(56) References Cited

U.S. PATENT DOCUMENTS

| | | | |
|---|---|---|---|
| 3,658,557 | * 4/1972 | Samejima et al. | 99/148 |
| 3,925,561 | * 12/1975 | Herstel et al. | 426/250 |
| 4,329,429 | * 5/1982 | Fenton . | |
| 4,448,791 | * 5/1984 | Fulde et al. | 426/94 |
| 4,640,837 | 2/1987 | Coleman et al. | 426/94 |
| 4,735,812 | * 4/1988 | Bryson et al. | 426/262 |
| 4,882,184 | * 11/1989 | Buckholz et al. | 426/243 |
| 4,886,659 | * 12/1989 | Baines et al. | 424/63 |
| 4,904,490 | * 2/1990 | Buckholz, Jr. et al. | 426/243 |
| 4,940,590 | * 7/1990 | Williams et al. | 426/92 |
| 4,942,047 | * 7/1990 | Buckholz, Jr. et al. . | |
| 4,968,522 | * 11/1990 | Steinke et al. | 426/602 |
| 5,043,173 | * 8/1991 | Steinke et al. | 426/94 |
| 5,139,800 | * 8/1992 | Anderson et al. | 426/243 |
| 5,139,810 | * 8/1992 | Kratky et al. . | |
| 5,196,219 | * 3/1993 | Hsu et al. | 426/302 |
| 5,232,723 | * 8/1993 | Bisson et al. | 426/281 |
| 5,415,883 | * 5/1995 | Leu . | |
| 5,429,831 | * 7/1995 | Williams et al. | 426/92 |
| 5,431,937 | * 7/1995 | Kandl et al. | 426/281 |
| 5,484,617 | * 1/1996 | Tiffany | 426/250 |
| 5,738,891 | * 4/1998 | Andreae et al. . | |
| 5,756,140 | * 5/1998 | Shoop et al. | 426/302 |

FOREIGN PATENT DOCUMENTS

| | | |
|---|---|---|
| 70458/96 | 8/1997 | (AU) . |
| 0 576 726 | 11/1992 | (EP) . |
| 0 643 923 | 9/1993 | (EP) . |

OTHER PUBLICATIONS

Rombauer et al, "Joy of Cooking", pp. 336–338, 1973.*

* cited by examiner

Primary Examiner—Cynthia L. Nessler
(74) Attorney, Agent, or Firm—Winston & Strawn

(57) ABSTRACT

A multi-functional marinade for fish and meat products that adds flavor to the fish or meat product and improves the texture and color of the fish or meat product during cooking. The marinade does not require the addition of other ingredients and can be applied immediately before cooking. The marinade can be a solid powder that is coated on the food or a liquid that is brushed or sprayed on the food.

22 Claims, No Drawings

MULTI-COMPONENT MARINADES

TECHNICAL FIELD

The present invention relates to a marinade for fish and meat products and to a process for flavoring the fish or meat products with the marinade.

BACKGROUND ART

Food products such as chicken, meats, and fish are often marinated before they are cooked. Marinades are known that add flavor to food products, that prevent the food products from losing moisture during cooking, or that effect the appearance of the cooked product.

Food products such as chicken, meat, and fish may be treated with a marinade before being cooked to minimize moisture loss during cooking, thus providing a juicier cooked product. European Patent 576,276 discloses a food coating to retain fluids in meat during cooking or storage. The coating consists of albumen, milk protein, starch and water. The food coating may also contain edible oil, salt, and unmodified starch. The coated food is heated to partially coagulate the albumen, denature the milk protein, and gelatinise the starch. The heat treated cooked food is then combined with sauces, retorted or vacuum packed, and heated to microbiological stability. The coating enhances fluid retention in the food during its preparation for immediate or subsequent consumption and during storage.

European Patent 643,923 discloses a coating for fish or meat that is a dry particulate mixture of 5–50 weight percent heat set protein and 95–50 weight percent unmodified starch. The ratio of protein to starch is 2–6:10. The protein is egg white protein or albumen and the starch is potato starch. After coating, the meat or fish is cooked, heated to an appropriate internal core temperature, and chilled or deep frozen. The coating enhances moisture retention during food preparation and storage.

It is also known to coat foods in order to impart a certain appearance to the cooked food product, such as a browned appearance. U.S. Pat. No. 4,640,837 discloses a coating composition for imparting a crisp golden brown surface to foodstuffs cooked in a microwave. The coating includes a blend of bread crumbs and oil, dextrin, pre-gelatanized starch, and soy protein concentrate.

Similarly, Australian Patent 96-70,458 discloses a coating mix composition which when coated onto moistened vegetables imparts a crisp golden brown texture with the taste, texture, and appearance of a fried food coating when the vegetables are baked. The product is neither oily or soggy. The composition includes bread crumbs, partially hydrogenated vegetable oil, modified starch, powdered shortening, carbohydrate adhesive, protein, vegetable lecithin, and seasonings.

Marinades that add flavor to food products are also known. A variety of marinades are commercially available to consumers which impart a variety of flavors to chicken, meats, and fish. These marinades typically require that an acidulant like vinegar, wine, or yogurt and oil be added before marinating. Moreover, it is necessary to marinate the food product for several hours or longer before cooking the food.

Currently there is no single marinade that can simultaneously add flavor, retain moisture, and brown the food in a single product. Thus, there remains a need for a marinade of this type so that flavor can be enhanced while the texture and color of the food product after cooking can be maintained. Furthermore, it would be desirable to have a marinade that does not require additional ingredients such as oil, vinegar, wine, or yogurt and does not require that the food product be marinated for a long period of time before cooking. Ideally, the marinade would be a solid powder that could be coated on the food or a liquid that could be sprayed or brushed on the food and would not require the food to be held for a long time prior to cooking. The present invention resolves this need.

SUMMARY OF THE INVENTION

The present invention provides a multi-functional marinade for fish or meat products. The multi-functional marinade includes three components. The first component is at least one flavoring agent in an amount sufficient to impart a flavor to the cooked product. The second component is a browning agent in an amount sufficient to impart a brown color to the cooked product. The browning agent includes a chromogen, a filler, and an enzyme modified ingredient. The enzyme modified ingredient is preferably a mixture of a carbonate and a dairy source that has been treated with a lactase, a protease, and then spray dried. The third component is partially hydrogenated fat in an amount sufficient to improve the mouthfeel of the cooked product.

The multi-functional marinade may also include a fourth component. The fourth component is a texture improvement agent in an amount sufficient to reduce moisture loss during cooking of the fish or meat product. The texture improvement agent typically includes a starch such as an oxidized starch or unmodified starch, and a protein, such as egg white powder, soy protein or whey protein.

Generally, the multi-functional marinade may be in the form of a dry powder, or in a liquid form. The liquid form may be a water-in-oil or oil-in-water emulsion prepared by mixing the dry powder with oil and water.

The invention also relates to a process for flavoring a fish or meat product by contacting the fish or meat product with the multi-functional marinade and then cooking the product to obtain an enhancement in flavor, texture, or color. The chicken or meat is cooked to a core temperature of between about 145° to 180° F. The method of cooking is at least one selected from the group consisting of grilling, steam cooking, oven cooking in conduction ovens, oven cooking in convection ovens, deep-frying, pan frying, and microwave cooking.

DETAILED DESCRIPTION OF PREFERRED EMBODIMENTS

The present invention relates to a multi-component marinade for a fish or meat product that can be conveniently applied. The term "fish or meat product" means any edible product that contains any fish or meat as the primary components. "Meat" includes chicken, beef, pork, lamb, turkey, or others whether used alone or in combination in a food product that is to be cooked before eating. The marinade enhances at least one of flavor, texture, or color of the final product.

The marinade may be used as a dry blend, or may be suspended in an emulsion to give a liquid multi-component marinade. The liquid marinade is a water-in-oil or an oil-in-water emulsion. The marinade flavors the fish or meat, retains moisture in the fish or meat, and browns the fish or meat when it is cooked. The marinade can be used with any method of cooking including, but not limited to, grilling, steam cooking, oven cooking, deep-frying, pan frying, microwave cooking, and cooking in a COMBI-OVEN™

(commercially available from Altosham Inc. of Menomonee Falls, Wis.). The marinade includes three components: a flavor component, a browning agent, and partially hydrogenated fat. The marinade may optionally include a fourth component which is a texture improvement agent.

The flavoring agent is present in an amount of about 10–60 percent by weight of the marinade. Preferably, the flavoring agent is present in an amount of about 20–50 percent by weight of the marinade and more preferably in an amount of 35–45 percent by weight of the marinade.

The browning agent is present in an amount of about 1–15 percent by weight of the marinade, preferably about 2–8 percent by weight of the marinade, and more preferably 3–5 percent by weight of the marinade.

The partially hydrogenated fat is present in an amount of about 10–60 percent by weight of the marinade, preferably about 15–35 percent by weight of the marinade, and more preferably 18–22 percent by weight of the marinade.

The texture improvement agent, if present, is present in an amount of about 30–60 percent by weight of the marinade, preferably about 32–38 percent by weight of the marinade.

The flavoring agent can be any blend of ingredients which are generally used in the food industry to flavor fish and/or meats. The flavoring agent is in a powdered form so that it can easily be mixed into the dry form of the marinade or into the emulsion. By flavoring agent is meant any ingredient which imparts flavor or taste to a food product.

Flavoring agents useful in the invention include, but are not limited to, seasonings, herbs, spices, salt, pepper, onion powder, garlic powder, other savory powders, oleoresins, and commercially available flavorings. Examples of commercially available flavorings include barbecue, southwestern, mesquite, cajun, garlic and herb, and teriyaki.

The browning agent is present to impart a desirable appearance to the cooked food. Preferably the browning agent imparts a roasted brown appearance to the cooked fish or meat. The browning agent of the present invention includes chromogens, a filler, and an enzyme modified protein.

Chromogens are ingredients which naturally impart color to a food product. Chromogens, useful with the present invention include, but are not limited to, caramel color, annatto natural color, tumeric, paprika, tea leaves, and the like. Generally the chromogens are present in an amount of about 1–60 percent by weight of the browning agent, preferably about 2–40 percent and more preferably about 10–20 percent.

Preferred chromogens are caramel color, for example, CARAMEL COLOR BC420 (commercially available from Sethness Products Co. of Chicago, Ill.); annatto natural color, for example, ANNATTO TYPE WJ810 ( commercially available from Warner Jenkinson Cosmetic Co. of South Plainfield, N.J.); and tumeric, for example, TUMERIC TYPE 30 (commercially available from Kalsec Inc. of Kalamazoo, Mich.). The caramel color when used is present in an amount of about 10–40 percent by weight of the browning agent, preferably 12–30 percent by weight of the browning agent, and more preferably 15–22 percent by weight of the browning agent. Annatto natural color when used is present in an amount of about 0.5–4 percent by weight of the browning agent, preferably 1–3 percent by weight of the browning agent, and more preferably 1.5–2.5 percent by weight of the browning agent. Tumeric when used is present in an amount of about 0–2 percent by weight of the browning agent, preferably 0.5–1.5 percent by weight of the browning agent, and more preferably 0.75–1.25 percent by weight of the browning agent.

The filler can be any filler. By filler is meant any inert material. Preferably the filler is a maltodextrin having a dextrose equivalent (DE) of between about 5 and 40. The filler is present in an amount of about 1–80 percent by weight of the browning agent, preferably 30–70 percent by weight of the browning agent, and more preferably, 60–70 percent by weight of the browning agent. Other fillers which may be used in the browning agent include unmodified starch and sweet whey.

The enzyme modified protein of the browning agent is an enzyme modified dairy source combined with a carbonate compound such as sodium bicarbonate ($NaHCO_3$). The enzyme modified dairy source is obtained by treating one or more dairy sources with a lactase and a protease. The dairy source can be any raw material derived from milk that is high in lactose. By high in lactose is meant a product having at least 10 percent lactose. The dairy source includes, but is not limited to, milk, cheese, casein, whey, and non-fat dry milk. In addition, wheat gluten hydrolysate may be used in place of the dairy source. Preferably the dairy source is non-fat dry milk or whey protein isolate, such as LACPRODAN 80 (commercially available from MD Foods Ingredients of Union, N.J.). Any lactase can be used, a suitable lactase, for example, is LACTOZYMETM™ (commercially available from Novo Nordisk Biochem North America of Franklinton, N.C.). Any protease may be used, a suitable protease, for example, is FLAVOURZYME™ (commercially available from Novo Nordisk Biochem North America of Franklinton, N.C.).

The enzyme modified ingredient is generally prepared by treating the dairy source dissolved in water at a concentration of about 30 percent w/v with about 0.01 to 2 percent w/v of the lactase, preferably about 0.25–1 percent w/v of the lactase, at a temperature of about 45° C., for about 2 hours. Following enzymatic hydrolysis with a lactase the solution of the dairy source is then treated with a protease in an amount of about 0.05 percent w/v, at a temperature of about 40–45° C., for about 6 hours. The resulting solution is then spray dried to produce a dry powder of the enzyme modified dairy source. A carbonate such as sodium bicarbonate is added to the spray dried enzyme modified dairy source in an amount of about 2–20 percent by weight of the spray dried enzyme modified dairy source, preferably about 10 percent by weight of the spray dried enzyme modified dairy source to give the enzyme modified ingredient. Browning of the fish or meat is enhanced when the enzyme modified ingredient is under alkaline conditions. The carbonate is added to provide the necessary alkaline conditions.

Without wishing to be bound by theory it is believed that the enzymes generate reducing sugars and amino acids as browning precursors. The lactase hydrolyzes lactose to form glucose and galactose and the protease hydrolyzes proteins in the dairy source to produce amino acids. When heated the amino acids react with the glucose or galactose to produce compounds which cause browning of the fish or meat.

The enzyme modified ingredient is present in an amount of about 40–80 percent by weight of the browning mixture, preferably 50–75 percent, by weight of the browning mixture and more preferably 60–70 percent by weight of the browning mixture.

The preferred browning agent for oven cooking, deep frying, or pan frying is 70–80 percent maltodextrin, 20–40 percent caramel color, 1–3 percent annatto, and 1–2percent turmeric.

The preferred browning agent for microwave cooking is 50–75 percent enzyme modified ingredient, 20–40 percent caramel color, and 1–3 percent annatto.

The partially hydrogenated fat is added to the marinade to give a better mouthfeel to the cooked fish or meat product. Any partially hydrogenated fat that is a solid at room temperature can be used. Thus, the partially hydrogenated fat should have a solid fat index of greater than 65 percent, and preferably greater than about 80 percent. Partially hydrogenated fats include, for example, soy bean oil, cottonseed oil and palm fat. The preferred partially hydrogenated fat is soy bean oil.

The texture improvement agent, when present in the marinade, is present to improve moisture retention of the fish or meat when it is cooked. The texture improvement agent leads to a more moist and juicy cooked product. The texture improvement agent includes at least one of an oxidized starch, such as BATTERCRISP 05330 (commercially available from Crestar Food Products Inc. of Richfield, Ohio) or a unmodified corn starch, such as MELOGEL (commercially available from National Starch and Chemical of Hawthorne, N.J.) and at least one of egg white powder or whey protein isolate. Optionally, the texture improvement agent may also include soy, protein, salt, and gelatin.

The oxidized starch or unmodified starch is present in an amount of 20–80 percent by weight of the texture improvement agent, preferably 40–70 percent by weight of the texture improvement agent, and more preferably about 55–65 percent by weight of the texture improvement agent. The egg white powder is present in an amount of up to about 30 percent by weight of the texture improvement agent, preferably, about 10–25 percent by weight of the texture improvement agent, and more preferably about 12–18 percent by weight of the texture improvement agent. Whey protein isolate such as LACPRODAN 80 (commercially available from MD Foods Ingredients of Union, N.J.) is present in an amount of up to about 25 percent by weight of the texture improvement agent, preferably, about 5–20 percent, and more preferably about 8–12 percent by weight of the texture improvement agent.

Soy protein isolate, such as SUPRO 660 (commercially available from Protein Technologies International, Inc. of Saint Louis, Mo.), may optionally be included in the texture improvement agent. Soy protein isolate is added to enhance the moisture retention or act as a replacement for the egg white powder in the formula. Soy protein isolate, when included in the texture improvement agent, is present in an amount of from 0–25 percent by weight of the texture improvement agent, preferably from 8–25 percent by weight of the texture improvement agent, and more preferably from about 11–15 percent by weight of the texture improvement agent.

Salt is optionally present in the texture improvement agent. Salt is added to enhance flavor especially when the texture improvement agent is used by itself. When present salt is included in an amount from about 0–20 percent by weight of the texture improvement agent, preferably from about 4–16 percent by weight of the texture improvement agent, and more preferably from about 6–10 percent by weight of the texture improvement agent.

Gelatin may also be optionally included in the texture improvement agent. Gelatin is added to improve the crunchiness and crispness of the coating and thus is preferred in deep frying applications. When present gelatin is included in an amount of up to about about 0–40 percent by weight of the texture improvement agent.

The amount of each component of the texture improvement agent can be varied so as to maximize performance in specific ovens. For example, a texture improvement agent having about 70–80 percent oxidized starch is preferable for chicken or meat that will be steam cooked. For a chicken or meat that is cooked in an oven about 70–80 percent unmodified corn starch is preferable and for deep fat frying a texture improvement agent having about 40–60 percent gelatin is preferable.

The preferred texture improvement agent for oven cooking includes 60–70 percent unmodified starch, 12–18 percent egg white or soy protein, 10–15 percent whey protein isolate, and 5–10 percent salt.

The preferred texture improvement agent for deep fat frying includes, 30–50 percent gelatin, 20–30 percent oxidized starch, and 0–15 percent egg white or soy protein or whey.

The preferred texture improvement for steam or high moisture cooking agent includes 65–75 percent oxidized starch, 12–18 percent egg white or soy protein, 10–15 percent whey protein isolate and 5–10 percent salt.

The texture improvement agent generally gives an improved percent yield after cooking of greater than about 5 percent, preferably greater than about 10 percent compared to an un-marinated food product. By percent yield after cooking is meant the weight of a piece of fish or meat after cooking compared to the weight before cooking. A higher percent yield indicates less weight loss during cooking. The reduction in weight for marinated fish and meat products is attributed to less moisture being lost during cooking. Without wishing to be bound by theory it is believed that the texture improvement agent prevents moisture loss in two ways. It is believed that heating denatures the egg white powder and/or whey protein and gelatanizes the starch to create a physical barrier to moisture loss. In addition, the starch acts as a water binder to inhibit the escape of moisture from the product.

The flavor component, browning agent, partially hydrogenated fat, and texture improvement agent, if present, are mixed and dry blended to make the marinade in powdered form. A ribbon blender or any similar machine can be used to blend the ingredients of the marinade. These machines are well known in the art and need not be described in further detail here.

A liquid marinade can also be prepared by suspending the powdered marinade in an oil-in-water or a water-in-oil emulsion. The liquid marinade can be prepared by heating vegetable oil, a partially hydrogenated oil, such as cottonseed oil, and an emulsifier, such as DIMODAN™ (commercially available from Danisco of Kansas City, Kans.) to about 60° C. or until a clear solution forms and then cooling the solution to about 40° C. To the resulting mixture of oils is added water which may optionally contain coloring. The oil and water mixture is then mixed and homogenized at a high shear rate to form a stable emulsion. Methods for homogenizing oil and water mixtures are well known in the art and need not be described here. To the resulting emulsion is added the powdered multi-component marinade that may have plated oleoresin. The powdered multi-component marinade and the emulsion and are then mixed to form a suspension.

The ratio of oil to water determines what type of emulsion is formed. For an oil-in-water emulsion a higher amount of water is used and for a water-in-oil emulsion a higher amount of oil is used. For a liquid marinade the amount of water in the liquid marinade is about 5–80 percent by weight of the liquid marinade. For water-in-oil emulsions the amount of water in the liquid marinade is preferably about 10–20 percent by weight of the liquid marinade and more preferably about 12–18 percent by weight of the liquid marinade.

The amount of vegetable oil, such as soybean oil, in the liquid marinade is about 5–75 percent by weight of the liquid marinade. For oil-in-water emulsions the amount of oil in the liquid marinade is preferably about 35–65 percent by weight of the liquid marinade, and more preferably about 45–55 percent by weight liquid marinade.

The amount of hydrogenated oil in the liquid marinade is about 1–10 percent by weight of the liquid marinade, preferably about 2–8 percent by weight of the liquid marinade, and more preferably about 3–5 percent by weight of the liquid marinade.

The amount of emulsifier in the liquid marinade is about 2–10 percent by weight of the liquid marinade, preferably about 3–8 percent by weight of the liquid marinade, and more preferably about 5–6 percent by weight of the liquid marinade. The type of emulsifier used is dependent on the type of emulsion required. The art of selecting emulsifiers and forming stable emulsions is well documented and need not be described here.

The amount of powdered multi-functional marinade in the liquid marinade is about 10–40 percent by weight of the liquid marinade, preferably about 15–30 percent by weight of the liquid marinade, and more preferably about 20–26 percent by weight of the liquid marinade.

The marinades of the invention are applied to the fish or meat product before it is cooked. The fish or meat can be fresh, frozen, or frozen and thawed. Preferably, the meat is fresh or frozen and thawed. The dry marinade is applied to the fish or meat by dredging the fish or meat in the marinade. Preferably the fish or meat is patted dry before being dredged. The powdered marinade is coated on the fish or meat at a level of at least 4 percent by weight of the fish or meat, preferably at 6–8 percent by weight of the fish or meat. The oil emulsion marinade is sprayed or brushed on the fish or meat. The liquid marinade is coated on the fish or meat at a level of at least about 6 percent by weight of the fish or meat, preferably at about 10–12 percent by weight of the chicken or meat. Preferably, the fish or meat is coated on all sides. The fish or meat coated with marinade is then cooked for an appropriate amount of time so that the fish or meat reaches a core temperature of about 145°–180° F., preferably about 160° F. By core temperature is meant the temperature of the fish or meat at the middle of its thickest point. Cooking can be accomplished by any means including, but not limited to grilling, steam cooking, oven cooking in conduction and convection ovens, deep-frying, pan frying, microwave cooking, and cooking in a COMBI-OVEN™ (a combination of steam and heat convection). The resulting cooked product has a golden brown color and a roasted appearance. In addition, the flavoring component adds additional flavor to the fish or meat. Furthermore, if the texture improvement agent is present in the marinade the marinated fish or meat is more moist and juicy than the non-marinated fish or meat. Moreover, samples that are cooked and cooled to room temperature and then reheated in a microwave show minimal change. Similarly, cooked fish or meat that is been kept warm in a COMBI-OVEN™ for 2 hours at 160° F. retains its good texture and appearance.

EXAMPLES

The invention is further defined by reference to the following examples described below. The examples are representative and should not be construed to limit the scope of the invention in any way. In these examples percentages are given as weight percents unless otherwise indicated.

Example 1

Southwestern Marinade

A dry multi-functional food marinade according to the invention was prepared according to the following procedure:

1. Sub-recipes of each component were batched up in a ribbon blender. The sub-recipes are provided in Tables 1–3.

2. The sub recipes were then used to form the final dry blend (Table 4).

TABLE 1

Southwest Flavor Blend

| Ingredient | Amount |
| --- | --- |
| Salt | 21.83% |
| TOMATO POWDER 404[a] | 23.08% |
| Chili Powder[a] | 13.03% |
| Yeast Extract Powder[a] | 10.87% |
| Chicken Flavor Powder[a] | 9.06% |
| Cilantro Powder[a] | 9.03% |
| Onion Powder (DURAROME ®)[a] | 5.03% |
| Sugar Granulated[a] | 3.03% |
| Garlic Flavor (DURAROME ®)[a] | 1.83% |
| Black Pepper (MCCORMICK 773442)[a] | 1.71% |
| Citric Acid Powder[a] | 1.50% |

[a]TOMATO POWDER 404 is commercially available from Spreda U.S.A., Inc. of Louisville, Ky; Chili Powder and Black Pepper are commercially available from McCormick and Co., Inc. of Hunt Valley, MD; Yeast Extract Powder is commercially available from food Ingredients Specialty, Inc. of Solon, OH; Chicken Flavor Powder is commercially available from International Flavor and Fragrances of New York, NY; Cilantro Powder is commercially available fromBasic Vegetable Products LP of Modesto, CA; DURAROME ® Onion Powder and Garlic Flavor are commercially available from Firmenich of Newark, NJ; Granulated Sugar is commercially available from Domino Sugar of Baltimore, MD, Citric Acid Powder is commercially available from ADM Food Additives Division, Decatur, IL.

TABLE 2

Browning Agent

| Ingredient | Amount |
| --- | --- |
| Enzyme modified dairy Ingredient | 61.40% |
| Sodium bicarbonate | 13.50% |
| CARAMEL COLOR BC420[a] | 24.10% |
| ANNATTO TYPE WJ 810[a] | 1.00% |

[a]CARAMEL COLOR BC420 is commercially available from Sethness Products Co. of Chicago, IL; ANNATTO TYPE WJ 810 is commercially available from Warner Jenkinson Cosmetic Co. of South Plainfield, NJ.

TABLE 3

Texture Improvement Agent

| Ingredient | Amount |
| --- | --- |
| Starch (BATTERCRISP 05330)[a] | 25.76% |
| Gelatin | 41.02% |
| SUPRO 660[a] | 12.57% |
| Egg White Powder[a] | 12.44% |
| Whey Protein Isolate (LACPRODAN 80)[a] | 8.21% |

[a]BATTERCRISP 05330 is commercially available from Crestar Food products, Inc. of Richfield, OH; SUPRO 660 is commercially available from Protein Technologies International, Inc. of Saint Louis, MO; Egg White Powder is commercially available from Henningsenn Foods, Inc. of David City, NE; LACPRODAN 80 is commercially available from MD Foods Ingredients of Union, NJ.

TABLE 4

Multi-component General Formula

| Ingredient | Amount |
|---|---|
| Southwest Flavor Sub-recipe | 22.20% |
| Browning Agent sub-recipe | 5.49% |
| Texture Improvement Agent Sub-recipe | 44.22% |
| Partially Hydrogenated Soybean Oil | 28.09% |

Example 2

A liquid multi-functional food marinade according to the invention was prepared according to the following procedure:

1. Vegetable oil, DIMODAN™ (commercially available from Danisco of Kansas City, Kans.) and partially hydrogenated oil was heated to 60° C. or until the solution turned clear. The solution was then cooled to 40° C.

2. Water was added to the mixture of oils and the resulting mixture homogenized with a POLYTRON™ (commercially available from KINEMATIC GmbH of Switzerland) to form a stable emulsion.

3. Oleoresin and color were plated on the dry blend of the marinade.

4. The dry blend of the marinade was then added to the emulsion and the emulsion mixed to from a suspension.

TABLE 5

Composition of Liquid Multi-functional Marinade.

| Ingredients | Amount |
|---|---|
| DRY MIX | |
| Salt | 4.23% |
| Natural Flavors | 5.00% |
| Yeast Extract Powder | 2.44% |
| Spices | 7.00% |
| Ribotides | 2.03% |
| TOMATO POWDER 404 | 1.35% |
| Starch Modified | 1.29% |
| WATER MIX | |
| Water | 16.00% |
| Natural Colors | 0.04% |
| OIL MIX | |
| Vegetable Oil | 49.26% |
| Partially Hydrogenated Cottenseed oil | 4.00% |
| Emulsifer DIMODAN ™ | 6.00% |
| Oleoresin[a] | 1.00% |
| TOTAL | 100.00% |

[a]Oleoresins are commercially available from Kalsec Inc. of Kalamazoo, MI and McCormick and Co., of Hunt Valley, MD.

In both examples, the chicken marinated with the multi-functional marinade was cooked in a COMBI-OVEN™ at 330° F. for 3 minutes with steam followed by 6–9 minutes cooking with dry heat. The yield of the cooked chicken was between 82–94 percent. The cooked chicken had a golden brown color.

What is claimed is:

1. A process for flavoring a fish or meat product comprising:
providing an uncooked fish or meat product;
coating the uncooked fish or meat product with a multi-functional marinade mixture comprising at least one flavoring agent in an amount sufficient to impart a flavor to the fish or meat product after it is cooked; a browning agent in an amount sufficient to impart a brown color to the fish or meat product after it is cooked, the browning agent comprising a chromogen, a filler, and an enzyme modified ingredient; and a partially hydrogenated fat in an amount sufficient to improve the mouthfeel of the fish or meat product after it is cooked, wherein the chromogen is at least one chromogen selected from the group consisting of caramel color, annatto color, paprika, tumeric, and tea leaves; the filler is maltodextrin; and the enzyme modified ingredient is a spray dried mixture of a carbonate and a dairy source that has been treated with supplemental lactase and supplemental protease; and
cooking the product to enhance at least one of flavoring, texture, or color of the cooked product.

2. The process of claim 1 wherein the fish or meat product is cooked to a core temperature of between about 145° to 180° F. by grilling, steam cooking, oven cooking in conduction or convection ovens, deep-frying, pan frying, or microwave cooking of the product.

3. The method of claim 1, wherein the flavoring agent is present in the marinade mixture in an amount of about 20–50 percent by weight of the marinade mixture, the browning agent is present in the marinade mixture in an amount of about 1–15 percent by weight of the marinade mixture, and the partially hydrogenated fat is present in the marinade mixture in an amount of about 10–60 percent by weight of the marinade mixture.

4. The process of claim 1, wherein the flavoring agent is selected from the group consisting of seasonings, herbs, spices, salt, pepper, onion powder, garlic powder, savory powders, and commercially available flavorings.

5. The process of claim 1, wherein the partially hydrogenated fat has a solid fat index of greater than 65 percent and is selected from the group of soybean oil, cotton seed oil, and palm fat.

6. The process of claim 1 wherein the marinade mixture is in liquid form, wherein the liquid is water or oil.

7. The process of claim 6 wherein the fish or meat product is cooked to a core temperature of between about 145° to 180° F. by grilling, steam cooking, oven cooking in conduction or convection ovens, deep-frying, pan frying, or microwave cooking of the product.

8. The process of claim 6, wherein the liquid form is an oil-in-water or water-in-oil emulsion, wherein the emulsion comprises water, vegetable oil, partially hydrogenated oil, emulsifier, and oleoresin.

9. The process of claim 8, wherein the water is present in an amount of about 5–75 percent by weight, the vegetable oil is present in an amount of about 25–75 percent by weight, the partially hydrogenated cottonseed oil is present in an amount of about 1–10 percent by weight, and the emulsifier is present in an amount of about 2–10 percent by weight.

10. The process of claim 1, wherein the marinade mixture further comprises a texture improvement agent in an amount sufficient to reduce moisture loss during cooking of the fish or meat product comprising at least one starch selected from the group of oxidized starch and unmodified starch, and at least one protein selected from the group of egg white powder, soy protein and whey protein.

11. The process of claim 10, wherein the fish or meat product is cooked to a core temperature of between about 145° to 180° F. by grilling, steam cooking, oven cooking in conduction or convection ovens, deep-frying, pan frying, or microwave cooking of the product.

12. The process of claim 10, wherein the flavoring agent is present in the marinade mixture in an amount of about 20–50 percent by weight of the marinade mixture, the browning agent is present in the marinade mixture in an amount of about 1–15 percent by weight of the marinade mixture, the partially hydrogenated fat is present in the marinade mixture an amount of about 10–60 percent by weight of the marinade mixture, and the texture improvement agent is present in the marinade mixture an amount of about 30–60 percent by weight of the marinade mixture.

13. The process of claim 10, wherein the oxidized or unmodified starch of the texture improvement agent is present in an amount of about 20 to 80 percent by weight of the texture improvement agent, the egg white powder of the texture improvement agent is present in an amount of up to about 30 percent by weight of the texture improvement agent, or the whey protein of the texture improvement agent is present in an amount of up to about 25 percent by weight of the texture improvement agent.

14. The process of claim 13, wherein the texture improvement agent further comprises soy protein, salt, or gelatin; with the soy protein being present in an amount of up to about 20 percent by weight of the texture improvement agent, the salt being present in an amount of up to about 20 percent by weight of the texture improvement agent, and the gelatin being present in an amount of up to about 40 percent by weight of the texture improvement agent.

15. The process of claim 1, wherein the marinade is in the form of a dry powder.

16. The process of claim 15, wherein treating the dairy source comprises dissolving the dairy source in water at a concentration of about 30 percent to provide a solution and treating the solution with about 0.1 to 2.0 percent w/v of the supplemental lactase and about 0.05 percent w/v of the supplemental protease.

17. The process of claim 15, wherein the chromogen is present in the browning agent in an amount of about 1–60 percent by weight, the filler is present in the browning agent in an amount of about 1–80 percent by weight, and the enzyme modified ingredient is present in the browning agent in an amount of about 40–80 percent by weight, and the carbonate is present in an amount of about 2–20 percent by weight of the spray dried enzyme modified dairy source.

18. The process of claim 17 wherein the carbonate is a bicarbonate or an alkali metal hydrogen carbonate, and the dairy source is at least one selected from the group consisting of non-fat dry milk and sweet whey.

19. A multi-functional marinade comprising a mixture of:
at least one flavoring agent in an amount sufficient to impart a flavor to a cooked fish or meat product that contains the mixture,
a browning agent in an amount sufficient to impart a brown color to a cooked fish or meat product that contains the mixture, the browning agent comprising a chromogen, a filler, and an enzyme modified ingredient; and
a partially hydrogenated fat in an amount sufficient to improve the mouthfeel of a cooked fish or meat product that contains the mixture, wherein the chromogen is at least one chromogen selected from the group consisting of caramel color, annatto color, paprika, tumeric, and tea leaves; the filler is maltodextrin; and the enzyme modified ingredient is a spray dried mixture of a carbonate and a dairy source that has been treated with supplemental lactase and supplemental protease.

20. The marinade of claim 19, wherein treating the dairy source comprises dissolving the dairy source in water at a concentration of about 30 percent to provide a solution and treating the solution with about 0.1 to 2.0 percent w/v of the supplemental lactase and about 0.05 percent w/v of the supplemental protease.

21. The marinade of claim 19, wherein the chromogen is present in the browning agent in an amount of about 1–60 percent by weight, the filler is present in the browning agent in an amount of about 1–80 percent by weight, and the enzyme modified ingredient is present in the browning agent in an amount of about 40–80 percent by weight, and the carbonate is present in an amount of about 2–20 percent by weight of the spray dried enzyme modified dairy source.

22. The multi-functional marinade of claim 21 wherein the carbonate is a bicarbonate or an alkali metal hydrogen carbonate, and the dairy source is at least one selected from the group consisting of non-fat dry milk and sweet whey.

* * * * *